(12) United States Patent
Tantot et al.

(10) Patent No.: US 11,987,369 B2
(45) Date of Patent: May 21, 2024

(54) TURBOMACHINE WITH UNDUCTED DUAL PROPELLERS

(71) Applicant: SAFRAN AIRCRAFT ENGINES, Paris (FR)

(72) Inventors: Nicolas Jérôme Jean Tantot, Moissy-Cramayel (FR); Anthony Binder, Moissy-Cramayel (FR); Mario Antoine Lambey, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 265 days.

(21) Appl. No.: 17/288,206

(22) PCT Filed: Oct. 25, 2019

(86) PCT No.: PCT/FR2019/052557
§ 371 (c)(1),
(2) Date: Apr. 23, 2021

(87) PCT Pub. No.: WO2020/084271
PCT Pub. Date: Apr. 30, 2020

(65) Prior Publication Data
US 2021/0403169 A1     Dec. 30, 2021

(30) Foreign Application Priority Data

Oct. 26, 2018   (FR) ...................................... 1859925

(51) Int. Cl.
*B64D 27/10*     (2006.01)
*B64C 11/30*     (2006.01)
(Continued)

(52) U.S. Cl.
CPC ............ *B64D 27/10* (2013.01); *B64C 11/306* (2013.01); *B64C 11/48* (2013.01); *B64D 27/24* (2013.01);
(Continued)

(58) Field of Classification Search
CPC ...... F02C 3/067; F02C 7/36; B64D 2027/005; B64D 2027/026; B64D 27/10;
(Continued)

(56) References Cited

U.S. PATENT DOCUMENTS

2010/0186418 A1   7/2010   Beutin et al.
2010/0206982 A1   8/2010   Moore et al.
(Continued)

FOREIGN PATENT DOCUMENTS

| CA | 2855442 A1 | 12/2015 |
|----|-----------|---------|
| FR | 2941492 B1 | 9/2011 |
| FR | 2994707 A1 | 2/2014 |

OTHER PUBLICATIONS

M. Hepperle, "Electric flight—Potential and limitations," in Proc. Work-shop on Energy Efficient Technologies and Concepts of Operation, Lisbon, Portugal, Oct. 22-24, 2012, pp. 1-30. (Year: 2012).*

(Continued)

*Primary Examiner* — David P. Olynick
(74) *Attorney, Agent, or Firm* — BIRCH, STEWART, KOLASCH & BIRCH, LLP (57) ABSTRACT

A turbomachine of an aircraft comprising an outer casing delimiting with an inner hub, a flow path of a gas stream in which is disposed a low-pressure turbine configured to rotationally drive a low-pressure shaft; said turbomachine comprising, in the direction of flow of the gas stream, a first propeller; and a second propeller downstream of the first propeller, the first propeller being rotationally driven by said (Continued)

low-pressure shaft and the second propeller being rotationally driven by an electric motor, the second propeller being further disposed at a distance between 1.5 and 4 cord lengths from the first propeller defined between the respective axes of shimming of each of the first and second propellers.

15 Claims, 10 Drawing Sheets

(51) Int. Cl.
  *B64C 11/48* (2006.01)
  *B64D 27/24* (2006.01)
  *F02B 61/04* (2006.01)
  *F02C 3/067* (2006.01)
  *F02C 7/36* (2006.01)
  *B64D 27/00* (2006.01)
  *B64D 27/02* (2006.01)

(52) U.S. Cl.
  CPC .............. *F02B 61/04* (2013.01); *F02C 3/067* (2013.01); *F02C 7/36* (2013.01); *B64D 2027/005* (2013.01); *B64D 2027/026* (2013.01); *F05D 2220/324* (2013.01); *F05D 2220/325* (2013.01); *F05D 2220/76* (2013.01)

(58) Field of Classification Search
  CPC ..... B64D 27/24; F02B 61/04; F05D 2220/76; F05D 2220/324; F05D 2220/325; F01D 15/10
  See application file for complete search history.

(56) References Cited

U.S. PATENT DOCUMENTS

2016/0023773 A1* 1/2016 Himmelmann ........ B64D 27/24
  903/903
2018/0118363 A1* 5/2018 Keller ................... B64D 35/04

OTHER PUBLICATIONS

Machine translation of FR2994707A1. Downloaded Mar. 17, 2023. (Year: 2014).*
Philip R. Gliebe and Bangalore A. Janardan, "Ultra-High Bypass Engine Aeroacoustic Study," NASA/CR-2003-212525, Oct. 2003 (Year: 2003).*
Robert Cameron Bolam, Yuriy Vagapov, Alecksey Anuchin, "Review of Electrically Powered Propulsion for Aircraft," Conference Paper • Sep. 2018, 978-1-5386-2910-9/18 © 2018 IEEE (Year: 2018).*
Chao Xu, "CFD Investigation into Propeller Spacing and Pitch Angle for a Ducted Twin Counter Rotating Propeller System," School of Aerospace Mechanical and Manufacturing Engineering College of Science Engineering and Health RMIT University, Australia, 2015. (Year: 2015).*
A. Filippone, "Historical development of the coaxial contra-rotating propeller," School of Engineering, The University of Manchester, Manchester, UK, Revised: Sep. 30, 2022; Accepted: Oct. 12, 2022, The Aeronautical Journal (2023), 127, pp. 699-736. (Year: 2022).*
French Search Report for French Application No. 1859925, dated Jul. 4, 2019.
International Search Report and Written Opinion of the International Searching Authority for International Application No. PCT/FR2019/052557, dated Feb. 7, 2020.

* cited by examiner

TURBOMACHINE WITH UNDUCTED DUAL PROPELLERS

GENERAL TECHNICAL FIELD

The invention relates to the field of turbomachines and more specifically relates to turbomachines of open rotor type.

PRIOR ART

Turbomachines of open rotor type belong to a class of architectures with the aim of maximizing power efficiency while having the ability to be integrated correctly (geometrically and aerodynamically) with the aircraft.

Several solutions in response to this situation are known.

A first solution is a counter-rotating open rotor (CROR) turbomachine as described for example in document FR 2 941 492. Such a turbomachine comprises an air inlet and a circulation path of a stream delimited by an outer casing and an inner hub. The path traverses a gas generator, here with a twin spool which powers a turbine driving two counter-rotating propellers. In this document, these two counter-rotating propellers rotate as a single part with a turbine of the gas generator. The turbomachine of this document has the particular benefit of combining an excellent propulsive efficiency linked to a generation of thrust via propellers with a very low pressure ratio, and outer dimensions less than those of a single-propeller turbomachine with the same thrust, facilitating its physical integration onto the aircraft. This architecture based on twin counter-rotating propellers does however have a certain number of limitations, particularly due to the complexity of the sub-systems required for its implementation (dual system for setting the pitch of the propellers, rotating casings under each propeller rotor etc.).

Another solution, in a variant of the twin counter-rotating propeller architecture is the USF (Unducted Single Fan) architecture, comprising a propeller rotor, and a variable-setting stator in its wake, intended to rectify the residual yaw of the propeller rotor. This variant can be seen as an architecture of CROR type in which the rotation of the downstream propeller is stopped. If it has a greater architectural simplicity, this solution does however suffer from a low-pressure module efficiency that is less good than the CROR solution, and requires larger diameters to maintain a rotor load equivalent to that of the CROR solution (this rotor load determining at the first order the perceived noise levels).

Finally, both the architectural solutions described above have the following drawbacks:
1. The almost one-on-one correspondence of the operation of the gas generator and the propulsive parts: during a reduction of the thrust requirement required by the aircraft (for end-of-cruise and idle phases), all the rotating parts operate at low power levels (low pressure ratio, low rotating speeds), which turns out to have an adverse effect on each component's own efficiency, particularly within the gas generator, significantly degrading the overall performance of the propulsive system.
2. The difficulty in extracting significant mechanical power from the shafts of the turbomachine without any major impact on the operability of the compressors. Specifically, with the growing need for the extraction of mechanical power for use by increasingly electrical aircraft airframes, it is necessary to adapt turbomachine architectures in such a way as to drive electric generators of increasing capacity. This leads to increasing the limitations on the compressors, leading to the necessary overdimensioning of the latter, which can harm their absolute performance.

OVERVIEW OF THE INVENTION

An aim of the invention is to propose a turbomachine architecture with two open-rotor propellers which does not have the aforementioned drawbacks.

For this purpose, the invention proposes, according to a first aspect, a turbomachine of an aircraft comprising an outer casing delimiting with an inner hub, a flow path of a gas stream in which is disposed a low-pressure turbine configured to rotationally drive a low-pressure shaft; said turbomachine comprising, in the direction of flow of the gas stream, a first propeller; and a second propeller downstream of the first propeller, the first propeller being rotationally driven by said low-pressure shaft and the second propeller being rotationally driven by an electric motor, the second propeller being further disposed at a distance between 1.5 and 4 cord lengths from the first propeller defined between the respective axes of shimming of each of the first and second propellers.

The invention according to the first aspect is advantageously completed by the following features, taken alone or in any of their technically possible combinations:

The second propeller has an outer diameter between 0.8 and 1 times the outer diameter of the first propeller.

The turbomachine comprises an inner hub from which the blades of the second propeller extend, the second propeller having a hub radius to outer blade radius ratio between 0.22 and 0.40.

The second propeller has a cord length between 0.8 and 1.2 times the cord length of the first propeller.

The turbomachine comprises a first electric motor/generator configured to contribute to rotationally driving a low-pressure shaft, the first propeller being rotationally driven by said low-pressure shaft by way of a reduction gear.

The propulsive system comprises or is linked to a power storage unit connected to the first and/or second electric motor/generator, the power storage unit having, preferably, a capacity between 200 and 500 kWh.

The first and the second propellers are disposed in front of the inlet of the flow path of the gas stream.

The first and the second propellers are disposed downstream of the path and outside the flow path of the gas stream.

The turbomachine comprises a gas generator, a unit for controlling the second electric motor/generator, a unit for controlling the angle of shimming of the second propeller, said controlling units being configured to control the second motor and the angle of shimming of the second propeller according to one of the following operating modes:

a first operating mode requiring a first given propulsive power, a first operating mode wherein the second motor/generator rotationally drives the second propeller in the opposite direction to the first, and the angle of shimming of the second propeller is controlled so that the second propeller supplies between 20% and 40% of said given propulsive power;

a second operating mode requiring a second given propulsive power, a second operating mode wherein the second motor/generator does not rotationally drive the second propeller and the angle of shimming of the second propeller is controlled in such a way as to maximize the efficiency of an aerodynamic coupling with the first propeller;

a third operating mode requiring a third given propulsive power, a third mode wherein the gas generator and the first propeller are regulated in such a way as to supply a propulsive power greater than the third given propulsive power;

a fourth operating mode wherein the angle of shimming of the first propeller 31 is positioned at a negative angle and wherein the second propeller is controlled with windmilling, the gas generator operating in a high-pressure reduced speed range between 90% and 100%, a fourth mode wherein the first propeller is in thrust reversal and the second propeller allows a reversal of the air stream feeding the first propeller;

a fifth operating mode wherein an overall level of thrust is maintained by the supply of power, exclusively electrical, to the second propeller rotor during a given time period;

a sixth operating mode wherein the second propeller has a malfunction:
  if the control of the angle of shimming of the second propeller is defective then the angle of shimming of the second propeller is blocked;
  if the second motor/generator of the second propeller is defective while the second propeller is controlled to be in free wheel.

In the third operating mode the angle of shimming of the second propeller can be controlled in such a way as to obtain an angle of incidence of the blades less than 0°, in order to rotationally drive the second propeller, in a direction of rotation opposite to the direction of rotation of the first propeller. It is also possible to control the second propeller in such a way as to obtain an angle of incidence of the blades greater than 0°, in order to rotationally drive the second propeller, in a direction of rotation identical to the direction of rotation of the first propeller.

Owing to this configuration of variable interactions between the two propellers, the performance of the turbomachine is increased.

Furthermore, it is possible to control the first and the second propeller in different ways according to the operating modes of the turbomachine.

OVERVIEW OF THE FIGURES

Other features, aims and advantages of the invention will become apparent from the following description, which is purely illustrative and non-limiting, and which must be read with reference to the appended drawings wherein.

In all the figures similar elements bear identical reference numbers.

DETAILED DESCRIPTION OF THE INVENTION

Figure 1:
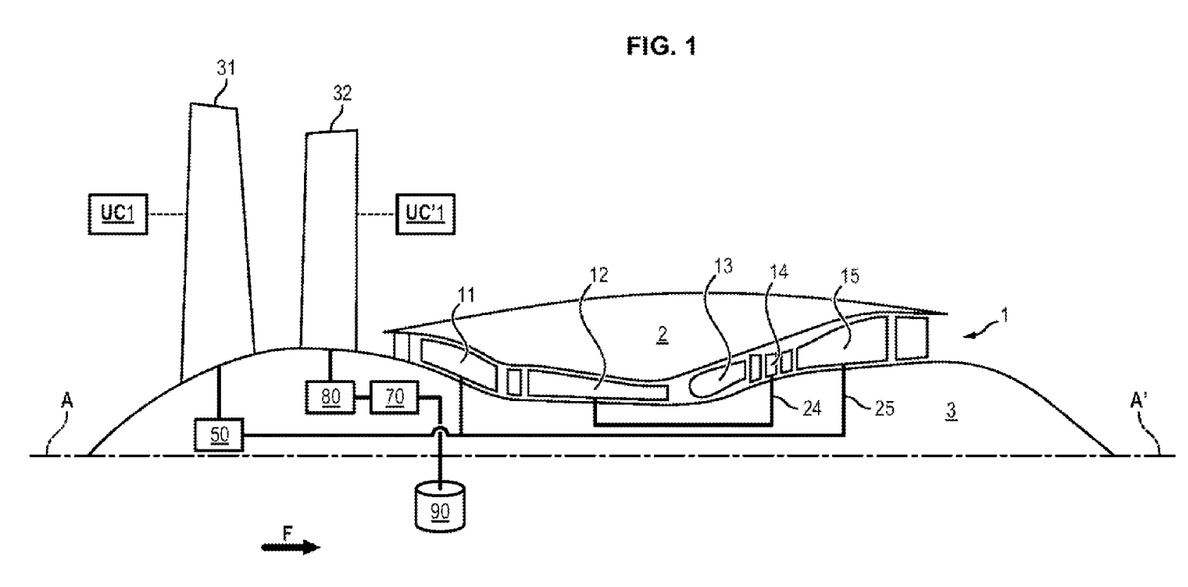
FIG. 1 illustrates, schematically, a turbomachine according to a first configuration in accordance with the invention.
Figure 2:
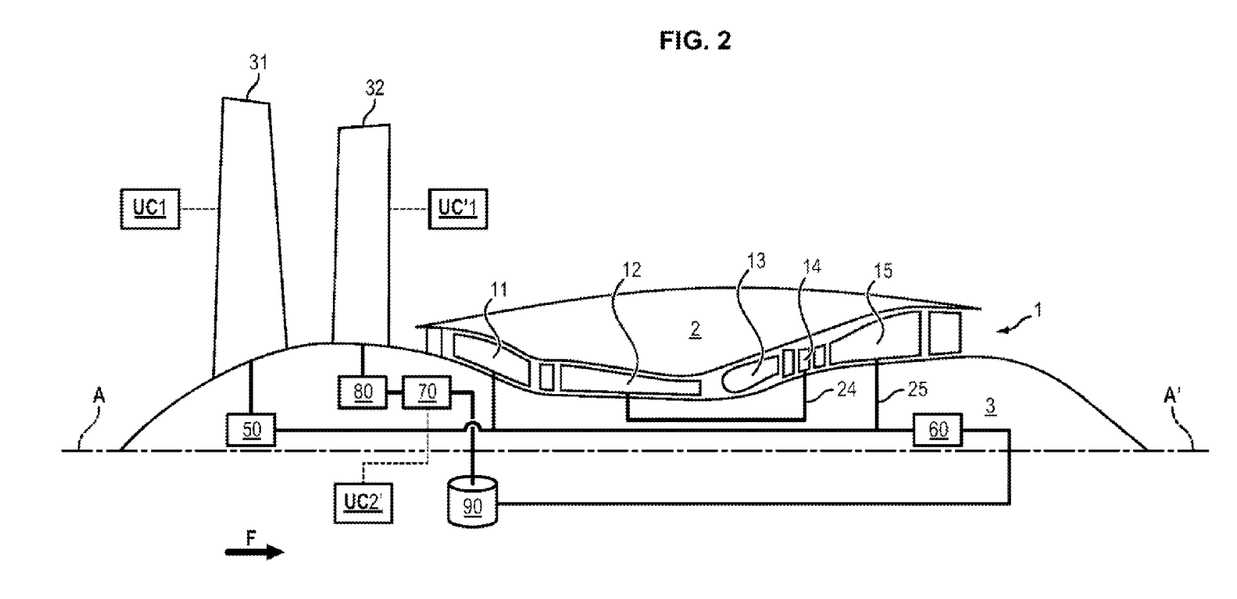
FIG. 2 illustrates, schematically, an alternative to the turbomachine according to the first configuration.
Figure 3:
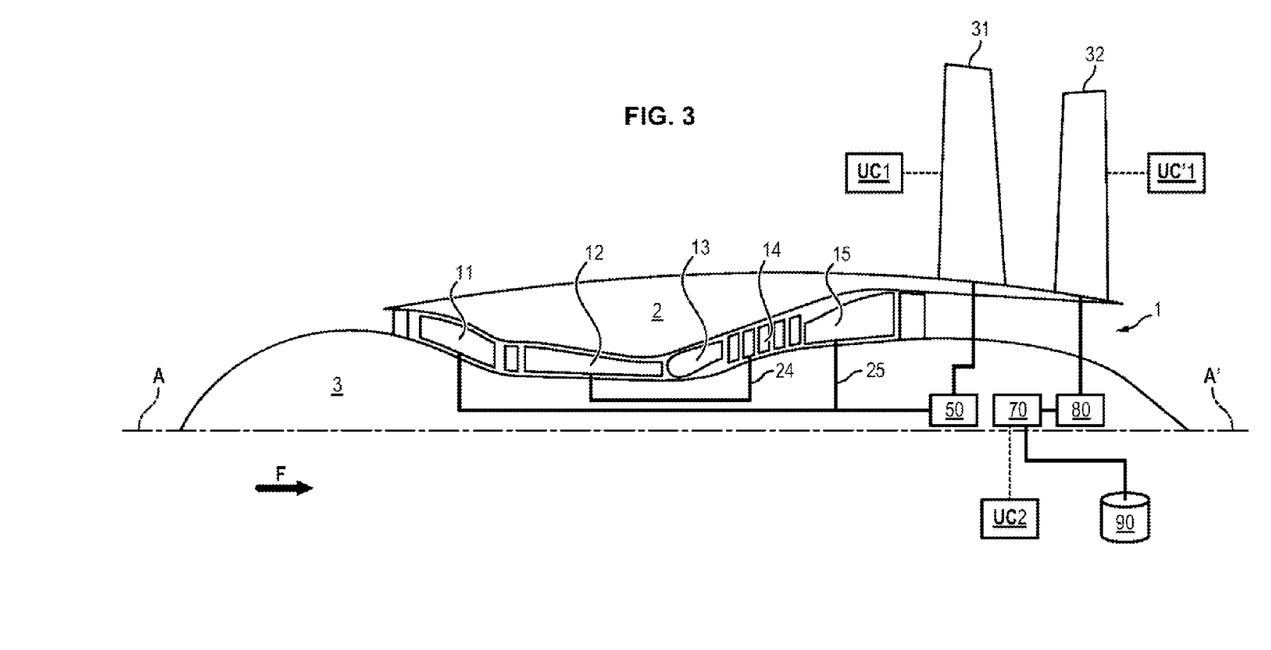
FIG. 3 illustrates, schematically, a turbomachine according to a second configuration in accordance with the invention.

In relation with FIGS. 1, 2 and 3, a turbomachine of an aircraft comprises an annular space 1 for a gas stream to flow, delimited by an outer casing 2 and an inner hub 3. Such an annular space 1 is called, hereinafter, a gas stream flow path.

The gas stream flow path 1 may comprise from upstream to downstream, in the direction of flow of the gas stream (along the axis AA' and represented by the arrow F), a low-pressure compressor 11, a high-pressure compressor 12, a combustion chamber 13, a high-pressure turbine 14 and a low-pressure turbine 15.

The low-pressure turbine 15 is configured to rotationally drive a low-pressure shaft 25 while the high-pressure turbine 14 is configured to rotationally drive a high-pressure shaft 24.

The turbomachine comprises, in the direction of flow of the gas, a first propeller 31 and a second propeller 32 downstream of the first propeller 31. The first and the second propellers are unducted (architecture of open rotor type).

The first and the second propellers 31, 32 extend from the inner hub 3 and comprise several blades extending from this inner hub 3.

Hereinafter is a description of the two configurations, a first configuration in relation to FIGS. 1 and 2 and a second configuration in relation to FIG. 3.

According to the first configuration, the first and the second propellers 31, 32 are disposed in front of the inlet of the gas stream flow path 1.

Alternatively, according to the second configuration the first and the second propellers 31, 32 are disposed at the outlet of the gas stream flow path. In particular, the first and the second propellers 31, 32 are disposed downstream and externally behind and above the gas stream flow path 1.

The two configurations differ from one another by the position of the first and the second propellers with respect to the inlet and the outlet of the gas stream flow path 1, (the inlet and the outlet being defined in the direction of flow of the gas stream).

Advantageously according to one or the other of the two configurations described above, the second propeller 32 is disposed at a distance between 1.5 and 4 cord lengths from the first propeller defined between respective axes of shimming of each of the first and second propellers 31, 32 as described hereinafter in relation to FIG. 4.

Figure 4:
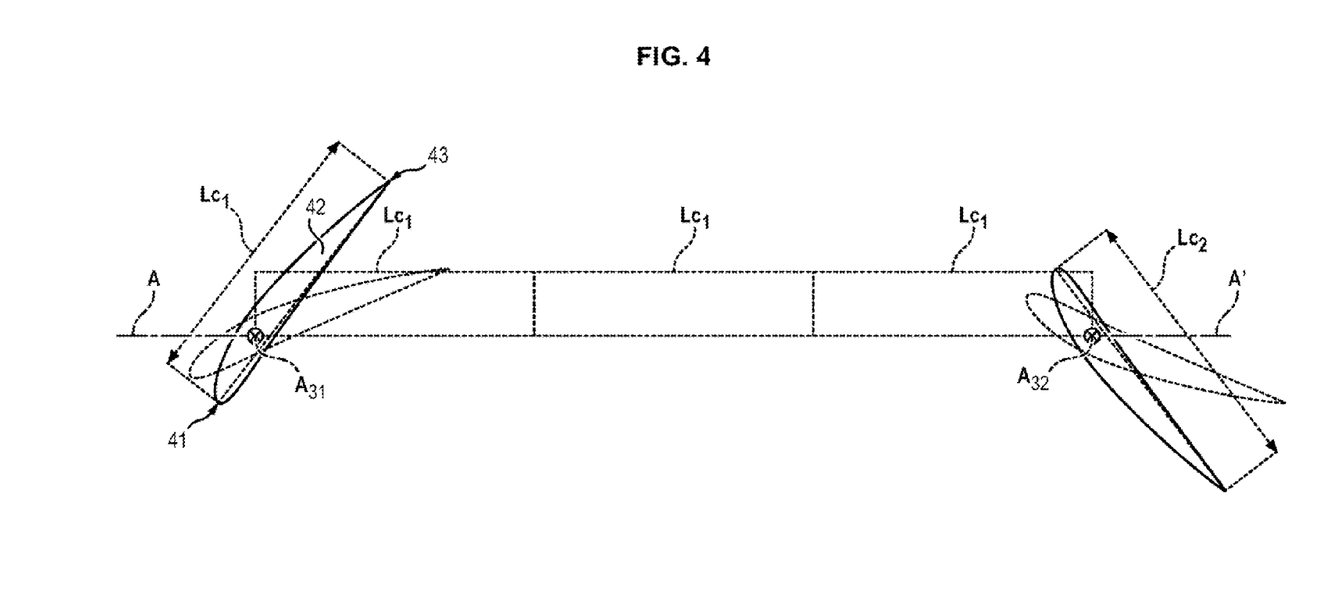
FIG. 4 illustrates the arrangement of the propellers of the turbomachine.

FIG. 4 illustrates the arrangement of the first 31 and second 32 propellers along the longitudinal axis AA' of the turbomachine. As illustrated in this figure, it is specified that the term "cord length LCi" (i=1 for the first propeller, i=2 for the second propeller) is understood to mean the cord length 42 i.e. the length of the segment (or cord) between the leading edge 41 and the trailing edge 43 of a propeller. Furthermore, the spacing between the two propellers 31, 32 is between the respective axes of shimming A31, A32 of each of the propellers 31, 32. In this figure, the propellers are spaced apart by three cord lengths LC.

Such a spacing between the two propellers 31, 32 makes it possible to have an aerodynamic coupling that can effectively contribute to the propulsion of the turbomachine.

Also, this spacing results from the aeroacoustic trade-off between:
  A distance between the two propellers that is great enough to limit the intensity of the acoustic interaction spikes between the propellers;
  A distance between the two propellers that is low enough to minimize the diffusion of the speed profiles at the outlet of the first propeller (upstream propeller) and favor their immediate re-exploitation by the deviation of the second propeller (downstream propeller).

In addition, this spacing takes into account the need to integrate the pitch change mechanisms of each propeller, mechanisms requiring a certain axial volume.

The second propeller 32 has, advantageously, the following geometrical features:
  An outer diameter between 0.8 and 1 times the outer diameter of the first propeller 31 upstream;
  A hub ratio (inner radius to outer blade radius ratio) between 0.22 and 0.40;
  A median cord between 0.8 and 1.2 times the median cord of the first propeller 31 upstream.

Advantageously, the first propeller 31 is rotationally driven by the low-pressure turbine 15, by way of the low-pressure shaft 25 and a first reduction gear 50 only, or else by the combination of a first electric motor/generator 60 and the low-pressure turbine 15, and this by way of the first same reduction gear 50. In this way the first electric motor/generator 60 makes it possible to occasionally palliate the deficiencies of the low-pressure shaft 25.

In this variant, in the event of failure of the contribution of the low-pressure turbine contributing to the power supply of the first propeller 31, the electric motor/generator 60 provides part of the power supply required for the first propeller 31.

This configuration illustrated in FIG. 2 is also applicable to the configuration of FIG. 3 wherein the propellers are located at the outlet of the annular space through which the gas stream flows.

The second propeller 32, meanwhile, is driven only rotationally driven by a second electric motor/generator 70 by way of a second reduction gear 80.

The first reduction gear 50 and the second reduction gear 80 are advantageously:
  mechanical (of epicyclic or sun gear type) having a rotation speed preferably between 8 and 12; or
  electromagnetic.

The turbomachine may comprise according to the configurations a first electric motor/generator 60 and a second electric motor/generator 70 that can operate as a "motor" but also as an "electricity generator".

The propulsive system comprises, in this regard, a power storage unit 90 connected to the first and/or the second electric motor/generator, the power storage unit having, preferably, a capacity between 200 and 500 kWh.

When the electric motor/generator 60, 70 operates as a motor, the storage unit 90 is a source of power supply for the electric motor/generator 60, 70 whereas when the propellers 31, 32 are not driven by the electric motor/generator 60, 70, the electric motor/generator makes it possible to recharge the storage unit 90.

Specifically, the electric motor/generator 60, 70 can enlist the contribution of the operating modes during which it is not used as a "motor" to recharge the storage unit 90.

Whatever the configuration, the turbomachine may comprise, associated with each propeller, a unit for controlling the angle of shimming of the propeller (units UC1 and UC'1 in the figures) which is characterized by:
  for the first propeller, a travel preferably between −30° and +90°;
  for the second propeller, a travel preferably limited to the positive angles of shimming, typically 0° to +90°/a maximum of 0° to +110°.

Here the terminology "propeller shimming" is used to refer to the shimming of each blade of the propeller.

Figure 5:
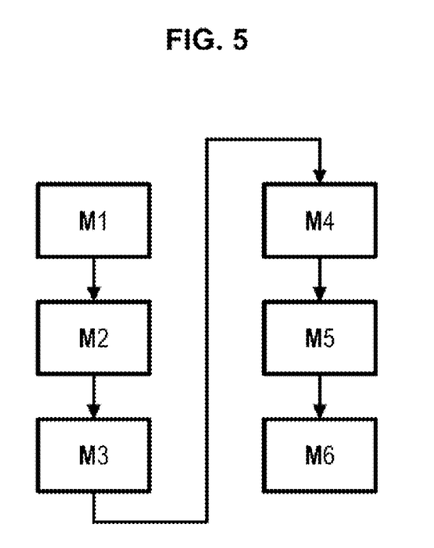
FIG. 5 illustrates the operating modes of the turbomachine in accordance with the invention.

The second propeller 32 is advantageously used in different ways according to several operating methods of the propulsive system of the aircraft. As will be described (in relation to FIG. 5), the second propeller 32 may have several functions to contribute to the operation of the aircraft according to these different configurations.

Thus, the turbomachine comprises a unit UC2 for controlling the second motor/generator associated with the second propeller 32, the unit UC2 for controlling the second motor/generator 70 making it possible to continuously drive the supply of electrical power for this second motor/generator between the extreme cases of zero supply and a supply corresponding to the maximum power of dimensioning of the second motor/generator 70.

Figure 6:
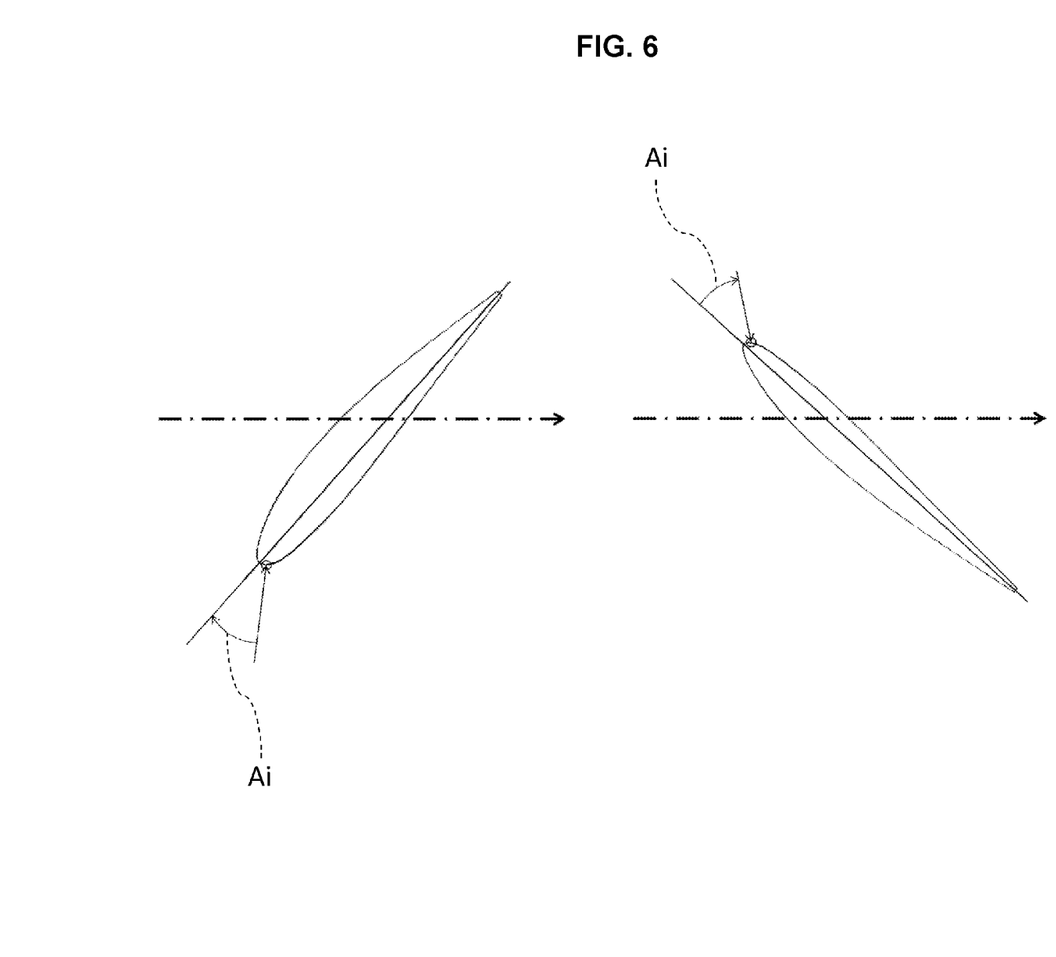
FIG. 6 illustrates, schematically, a first operating mode of the turbomachine in accordance with the invention, corresponding to the take-off of the aircraft.

A first operating mode M1 corresponds to the take-off/climb of the aircraft, a mode during which the turbomachine needs a strong propulsive power, known as the given propulsive power:
  The second motor/generator 70 is in "motor" mode and uses the power of the storage unit 90 as a supply in order to rotationally drive the second propeller 32;
  The angle of shimming of the second propeller is set so that the second propeller 32 supplies a thrust approximately 20 to 40% of the given propulsive power (or ~5 MW maximum for a short/medium-haul carrier), and so that the angle of incidence of the blades Ai is greater than 0° (as illustrated in FIG. 6);
  The gas generator operates in a high-pressure reduced speed range (N2K) between 90 and 100% as a function of the flow rate of fuel injected into the combustion chamber.

During this first operating mode M1, the setting of the first propeller 32 to rotate makes it possible to reduce the power level required on the first propeller 31 to ensure the global thrust required by the propulsive system, which makes it possible to dimension the diameter of the first propeller 31 on a lower value than that which the prior art would demand if no thrust boost is supplied via the propeller 32. Such a reduction in the diameter makes it possible to have a first propeller 31 which can be easily integrated while maintaining a high power efficiency of the overall propulsive system.

Furthermore, the power level required on the low-pressure shaft is reduced, in the same way as that required by the gas generator which has the consequence of dimensioning the annular gas flow space to a lower value adapted to this reduced level of required power. There is a benefit in terms of the mass of the turbomachine with improved performance as well as a reduction in unwanted sound due to the gas exhaust at the outlet of the gas generator.

Figure 7:
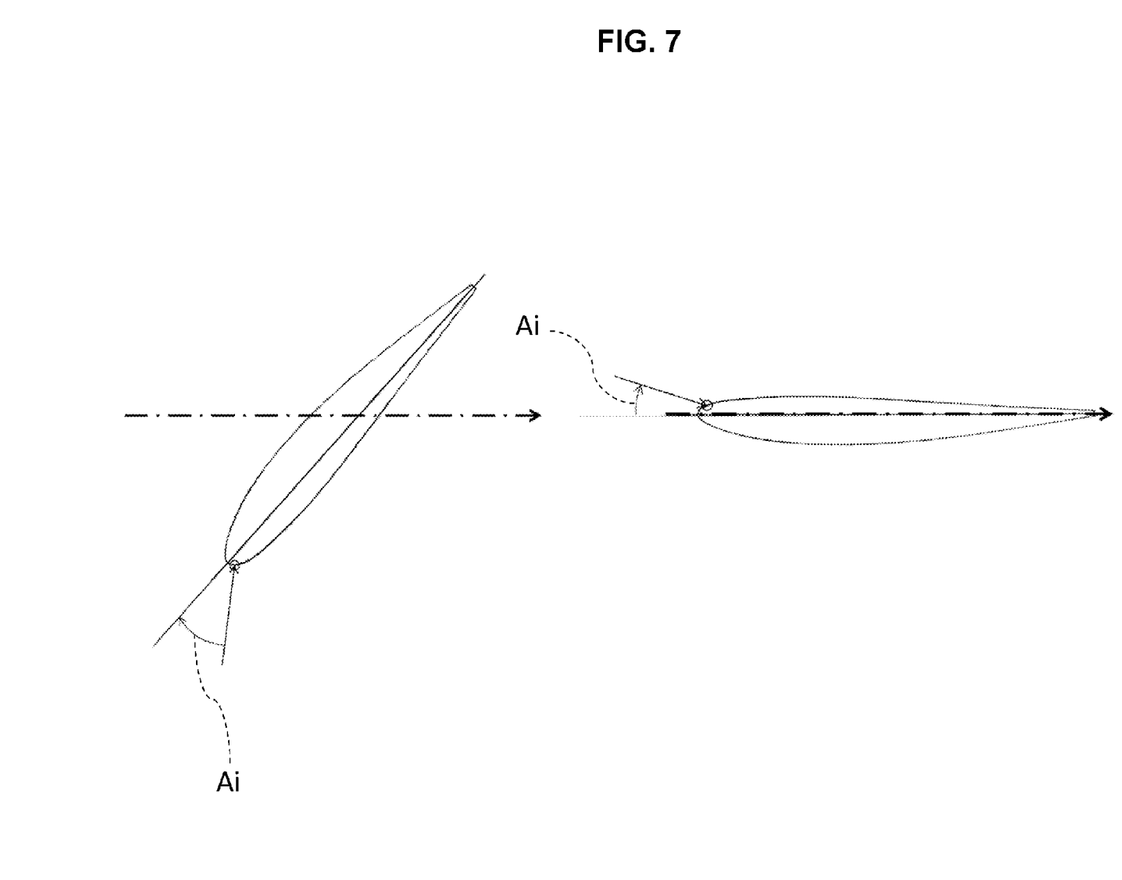
FIG. 7 illustrates, schematically, a second operating mode of the turbomachine in accordance with the invention, corresponding to the cruise phase of the aircraft.

A second operating mode M2 corresponds to the cruise phase of the aircraft, a mode during which the turbomachine needs intermediate propulsive power:

the second motor/generator 70 is unused, the second propeller 32 does not receive any mechanical power, it is in "free wheel";

The angle of shimming of the second propeller 32 is driven in conjunction with the angle of shimming of the first propeller 31 in such a way as to maximize the propulsive efficiency of its combination with the first propeller 31 upstream, always so that the angle of incidence of the blades Ai is greater than 0° (as illustrated in FIG. 7). The second propeller 32 therefore operates as a straightener. Its rotation speed is free and depends on the aerodynamic coupling with the first propeller 31: either stopped, or in very slow rotation. The gas generator and the first propeller 31 are regulated in such a way as to exactly meet the desired propulsion requirement. The angles of shimming are the result of previous aerodynamic predictions.

The gas generator operates in a high-pressure reduced speed range between 80 and 90%

During this second operating mode M2, the propulsive efficiency of the first propeller 31 is maximized by re-use of its residual yaw. The yaw of the flow (set to rotate undesirably since the rotation does not contribute to the increase in flow speed along the propulsive axis) coming from the first propeller is recovered by the interaction with the blades of the second propeller (here virtually immobile), and re-used in the form of speed vector of the flow oriented along the main propulsion axis.

Figure 8:
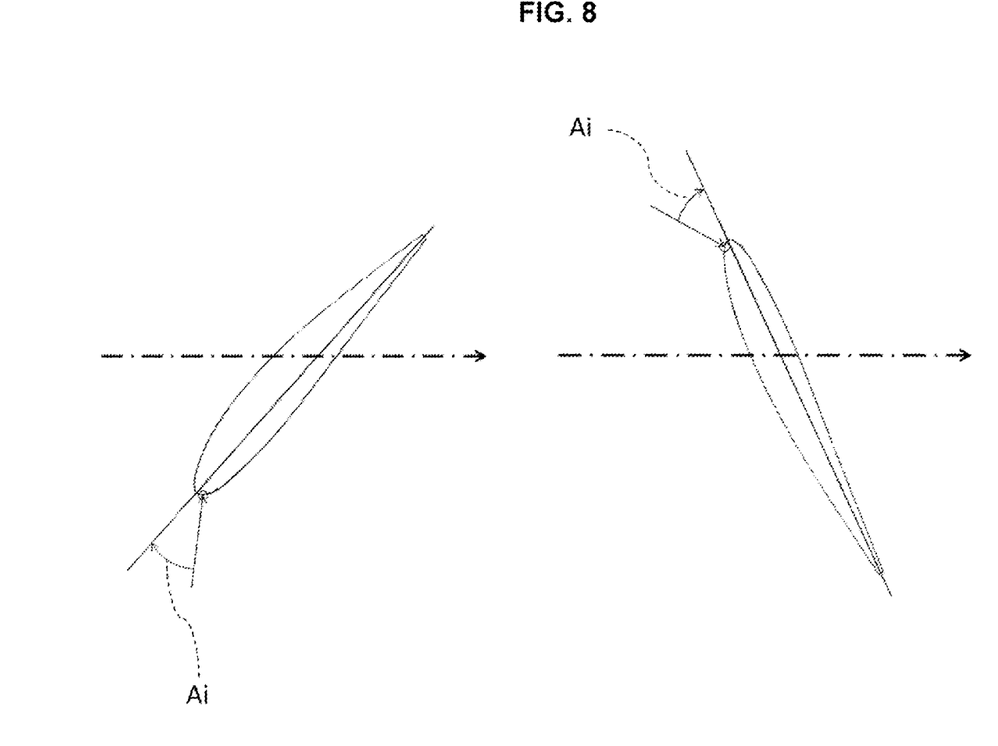
FIG. 8 illustrates, schematically, a third operating mode of the turbomachine in accordance with the invention, according to a first embodiment, corresponding to an idle descend of the aircraft.
Figure 11:
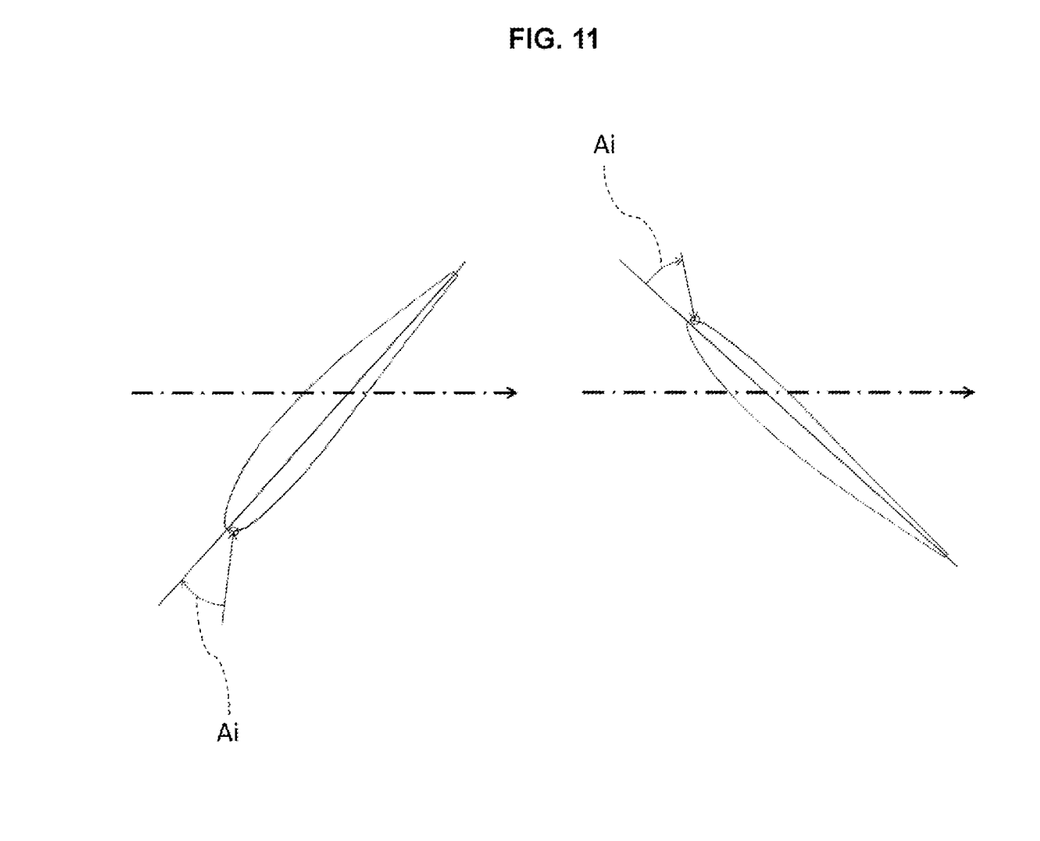
FIG. 11 illustrates, schematically, a third operating mode of the turbomachine in accordance with the invention, according to a second embodiment, corresponding to an idle descend of the aircraft.

A third operating mode M3 corresponds to an idle descend of the aircraft, during which the turbomachine needs low power;

The gas generator and the first propeller 31 are set to an operating point in excess of the actual propulsion requirement;

The excess power generated takes the form of an excess of enthalpy, and a yaw at the outlet of the first propeller 31. This excess power is recovered on the second propeller 32 which is then set to rotation and operates in windmill mode via the choice of an appropriate angle of shimming. The mechanical power thus recovered on the second propeller 32 powers the second motor/generator 70 which thus operates in generator mode, recharging the storage unit 90.

The gas generator operates in a high-pressure reduced speed range between 90 and 100% according to the flow rate of the fuel injected into the combustion chamber.

During this third operating mode M3, the power uncoupling of the propulsion requirement and of the operating point of the gas generator and of the first propeller 31 makes it possible to position these latters on output zones that are much more favorable than those achieved with a classic configuration in idle. This also makes it possible to stay out of critical compressor operability zones by way of the positioning of the gas generator on medium/high power levels for which the operability is less critical than under idle conditions.

Figure 9:
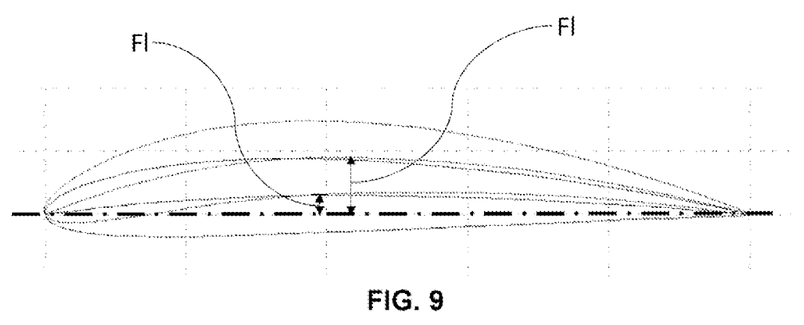
FIG. 9 illustrates, schematically, the deflection of a propeller of the turbomachine in accordance with the invention.
Figure 10:
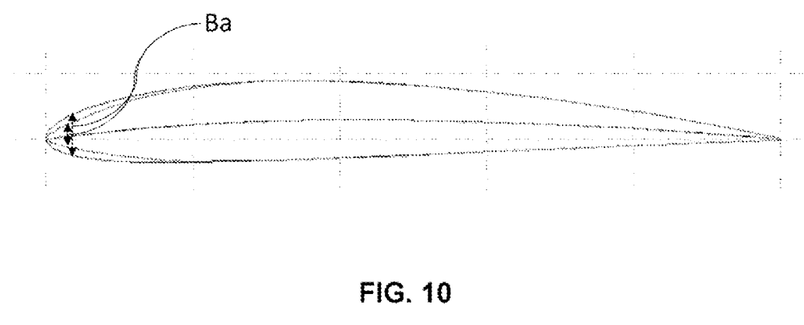
FIG. 10 illustrates, schematically, the leading edge of a propeller of the turbomachine in accordance with the invention.

This operating mode M3 may be obtained according to two embodiments:

In a first embodiment (as illustrated in FIG. 8), the angle of shimming of the second propeller 32 is modified such that the angle of incidence of the blades Ai is greater than 0°. This modification of the angle of incidence of the blades Ai has the effect of obtaining a lift coefficient less than 0, and thus makes it possible to rotationally drive the second propeller 32 in a direction of rotation opposite to the direction of rotation of the first propeller 31. This embodiment thus makes it possible to keep the same direction of rotation of the second propeller 32 as in the other operating modes, and thus avoids the complexification of the gear box. However, it also entails the modification of the geometry of the propeller by reducing the deflection FI, which corresponds to the maximum distance between the cord and the line of camber (represented in FIG. 9). In addition, in order to avoid debonding, it is necessary to design blades with a wide leading edge Ba (represented in FIG. 10);

In a second embodiment (as illustrated in FIG. 11), the angle of shimming of the second propeller 32 is modified such that the angle of incidence of the blades Ai is greater than 0°. This modification of the angle of incidence of the blades Ai makes it possible to rotationally drive the second propeller 32 in the same direction of rotation as the first propeller 31. This embodiment entails the design of a gearbox allowing the second propeller 32 to turn in both directions. However, it does not entail any modification of the geometry of the propeller given that its aerodynamic operation remains the same as in the other operating modes.

A fourth operating mode M4 corresponding to the braking of the aircraft:

The shimming of the first propeller 31 is positioned at a negative angle;

The second propeller 32 is left windmilling which makes it possible to not generate any mechanical power on the propeller;

The gas generator is operating in a high-pressure reduced speed range between 90 and 100%.

During this fourth operating mode M4, there is a reversal of thrust on the first propeller 31 and the second propeller 32 has a shimming chosen in such a way as to allow the reversal of the air stream powering the first propeller 31.

A fifth operating mode corresponds to a malfunction of the first propeller 31 or a malfunction of the gas generator:

The angle of shimming of the first propeller 31 is in a windmilling position if the malfunction of this first propeller allows it, or else kept at its shimming value at the time of occurrence of the malfunction The angle of shimming of the first propeller 32 is positioned in a full-pull position, i.e. at an angle of shimming similar to that of the first propeller 31 when it is operating in conditions for supplying the maximum power;

The second motor/generator 70 is controlled to supply a maximum amount of power to the second propeller 32.

During this fifth operating mode M5, a minimum overall thrust level is maintained during a certain time period (by way of the powering of the second propeller 32 in order to maintain a pull capacity, the thrust is then exclusively generated by the second rotor 32), a time period determined by the capacity of the second electric motor/generator 70 and the power available in the storage unit 90 associated with it. This fifth operating mode thus makes it possible to minimize the impact of a loss of thrust of the first propeller 31 or a loss of a primary power supply coming from the gas generator.

A sixth operating mode M6 also corresponds to a malfunction but this time of the second propeller 32:

If the malfunction stems from the fact that it is not possible to control the angle of shimming of the second propeller 32 then the angle of shimming of the second propeller 32 is kept blocked in its last occupied position;

If the malfunction comes from the second motor/generator 70 then the second propeller 32 is left in free wheel while the shimming interval makes it possible to provide a thrust;

Such a sixth operating mode M6 makes it possible to have a turbomachine architecture which is robust in the event of failure of the second propeller.

As already described, the first electric motor/generator 60 associated with the first propeller 31 can serve supplement the rotation by the low-pressure turbine 15 (see FIG. 2).

This configuration allows:

The assistance of the low-pressure shaft (first propeller 31 upstream) by the first electric motor/generator 60;
    In the case of the first operating mode: assistance at take-off, jointly with the assistance already produced by the second propeller 32;
    In the event of failure of the gas generator during the fifth operating mode: ability to have the first propeller driven for a limited time period by the contents of the power storage unit;
The transfer of power in real time between the second propeller 32 and the low-pressure shaft: even when the storage unit linked to the first motor/generator in "generator" mode is empty, the second propeller 32 can thus be given mechanical power as needed;
A recharging profile of the first motor/generator in a "motor" mode which is more efficient since it is directly linked to the low-pressure turbine.

The invention claimed is:

1. A turbomachine of an aircraft,
the turbomachine comprising:
an inner hub,
a low-pressure shaft,
a low pressure turbine configured to rotationally drive the low-pressure shaft,
an outer casing delimiting with the inner hub a flow path of a gas stream in which is disposed the low-pressure turbine, and
an electric motor/generator,
a first propeller, having a first axis of shimming, configured to be rotationally driven by the low-pressure shaft; and
a second propeller, having a second axis of shimming, downstream of and coaxial with the first propeller, and configured to be rotationally driven by the electric motor/generator,
the second propeller being disposed at a distance between 1.5 and 4 cord lengths from the first propeller, the distance being defined between the respective axes of shimming of each of the first and second propellers using a cord length of the first propeller.

2. A turbomachine as claimed in claim 1, wherein the second propeller has an outer diameter between 0.8 and 1 times an outer diameter of the first propeller.

3. A turbomachine as claimed in claim 1, wherein blades of the second propeller extend from the inner hub, the second propeller having a hub radius to outer blade radius ratio between 0.22 and 0.40.

4. A turbomachine as claimed in claim 1, wherein the second propeller has a cord length between 0.8 and 1.2 times the cord length of the first propeller.

5. A turbomachine as claimed in claim 1,
the electric motor/generator being a second electric motor,
wherein the turbomachine further comprises a first electric motor/generator configured to contribute to rotationally drive the low-pressure shaft,
the first propeller being configured to be rotationally driven by the low-pressure shaft by way of a reduction gear.

6. A turbomachine as claimed in claim 1, further comprising a power storage unit connected to the electric motor/generator.

7. The turbomachine as claimed in claim 6 wherein the power storage unit has a capacity between 200 and 500 kWh.

8. A turbomachine as claimed in claim 1, wherein the first and the second propellers are disposed in front of an inlet of the flow path of the gas stream.

9. A turbomachine as claimed in claim 1, wherein the first and the second propellers are disposed downstream of the flow path and outside the flow path of the gas stream.

10. A propulsive system comprising a turbomachine as claimed in claim 1, and further comprising a power storage unit connected to the electric motor/generator.

11. The propulsive system as claimed in claim 10, wherein the power storage unit has a capacity between 200 and 500 kWh.

12. The turbomachine as claimed in claim 1, further comprising:
a gas generator,
a unit for controlling the electric motor/generator, and
a unit for controlling an angle of shimming of the second propeller,
the controlling units being configured to control the electric motor/generator and the angle of shimming of the second propeller according to one of the following operating modes:
a first operating mode requiring a first given propulsive power wherein the electric motor/generator rotationally drives the second propeller in an opposite direction to the first propeller and the angle of shimming of the second propeller is controlled so that the second propeller supplies between 20% and 40% of the first given propulsive power;
a second operating mode requiring a second given propulsive power wherein the electric motor/generator does not rotationally drive the second propeller and the angle of shimming of the second propeller is controlled in such a way as to maximize a propulsive efficiency of the turbomachine;
a third operating mode requiring a third given propulsive power wherein the gas generator and the first propeller are regulated in such a way as to supply a propulsive power greater than the third given propulsive power;
a fourth operating mode wherein an angle of shimming of the first propeller is positioned at a negative angle and wherein the second propeller is controlled with windmilling, the gas generator operating in a high-pressure reduced speed range wherein a flow rate of fuel injected into a combustion chamber of the gas generator is between 90% and 100% of a nominal flow rate of the gas generator, and wherein the first propeller is in thrust reversal and the second propeller allows a reversal of an air stream feeding the first propeller;

a fifth operating mode wherein an overall level of thrust is maintained by an exclusively electrical supply of power to the second propeller during a given time period; and a sixth operating mode wherein:

if a control of the angle of shimming of the second propeller is defective, then the angle of shimming of the second propeller is blocked; and if the second electric motor/generator of the second propeller is defective, then the second propeller is controlled to be in free wheel.

13. The turbomachine as claimed in claim 12, wherein in the third operating mode the angle of shimming of the second propeller is controlled in such a way as to obtain an angle of incidence of the blades less than 0° in order to rotationally drive the second propeller in a direction of rotation opposite to a direction of rotation of the first propeller.

14. The turbomachine as claimed in claim 12, wherein in the third operating mode the angle of shimming of the second propeller is controlled in such a way as to obtain an angle of incidence of the blades greater than 0° in order to rotationally drive the second propeller in a direction of rotation identical to the direction of rotation of the first propeller.

15. A turbomachine of an aircraft, the turbomachine comprising:

an inner hub, a low-pressure shaft, a low pressure turbine configured to rotationally drive the low-pressure shaft, an outer casing delimiting with the inner hub a flow path of a gas stream in which is disposed the low-pressure turbine, and an electric motor/generator, a first propeller, having a first axis of shimming, configured to be rotationally driven by the low-pressure shaft; and a second propeller, having a second axis of shimming, downstream of and coaxial with the first propeller, and configured to be rotationally driven by the electric motor/generator via a first reduction gear, the second propeller being disposed at a distance between 1.5 and 4 cord lengths from the first propeller, the distance being defined between the respective axes of shimming of each of the first and second propellers using a cord length of the first propeller.

* * * * *